(12) United States Patent
Erikson

(10) Patent No.: US 9,361,716 B1
(45) Date of Patent: Jun. 7, 2016

(54) SYSTEM AND METHOD FOR INCREASING THE SYSTEM AWARENESS OF IT OPERATIONS PERSONNEL WITH AUGMENTED REALITY

(71) Applicant: Erik Erikson, Seattle, WA (US)

(72) Inventor: Erik Erikson, Seattle, WA (US)

(73) Assignee: CA, Inc., New York, NY (US)

( * ) Notice: Subject to any disclaimer, the term of this patent is extended or adjusted under 35 U.S.C. 154(b) by 164 days.

(21) Appl. No.: 13/843,146

(22) Filed: Mar. 15, 2013

(51) Int. Cl.
  *G06T 11/60* (2006.01)

(52) U.S. Cl.
  CPC .................................... *G06T 11/60* (2013.01)

(58) Field of Classification Search
  CPC ....... G06T 11/60; G06T 19/006; G06F 3/012; H04N 13/004
  See application file for complete search history.

(56) References Cited

U.S. PATENT DOCUMENTS

| 2011/0310227 A1* | 12/2011 | Konertz et al. ............. 348/46 |
| 2013/0044042 A1 | 2/2013 | Olsson et al. |
| 2013/0241899 A1* | 9/2013 | Kienzl ................ G06F 3/011 345/179 |
| 2014/0043436 A1* | 2/2014 | Bell et al. ................ 348/46 |
| 2014/0123323 A1* | 5/2014 | Jung et al. ................ 726/30 |
| 2014/0143868 A1* | 5/2014 | Shiva ................ G06F 21/552 726/23 |

OTHER PUBLICATIONS

Computer Associates, Unicenter TNG: Getting Started, pp. 2.3-2.5 (2000).

* cited by examiner

*Primary Examiner* — Xiao Wu
*Assistant Examiner* — Chong Wu
(74) *Attorney, Agent, or Firm* — Baker Botts L.L.P.

(57) ABSTRACT

A method includes receiving sensor data from a sensor. The sensor data includes location data, and an image of a viewing area. The method also includes determining markers in the viewing area based on the sensor data. The markers indicate Configuration Items ("CI's") within the viewing area. The method further includes determining a coordinate system of the viewing area utilizing the sensor data. The method still further includes receiving CI data corresponding to the CI's within the viewing area. The method even further includes formatting for display the CI data. The formatting includes generating a visual representation based on the CI data. The formatting also includes projecting the visual representation onto the coordinate system in an augmentation pane based on coordinates of the markers. The formatting further includes overlaying the viewing area with the augmentation pane.

20 Claims, 5 Drawing Sheets

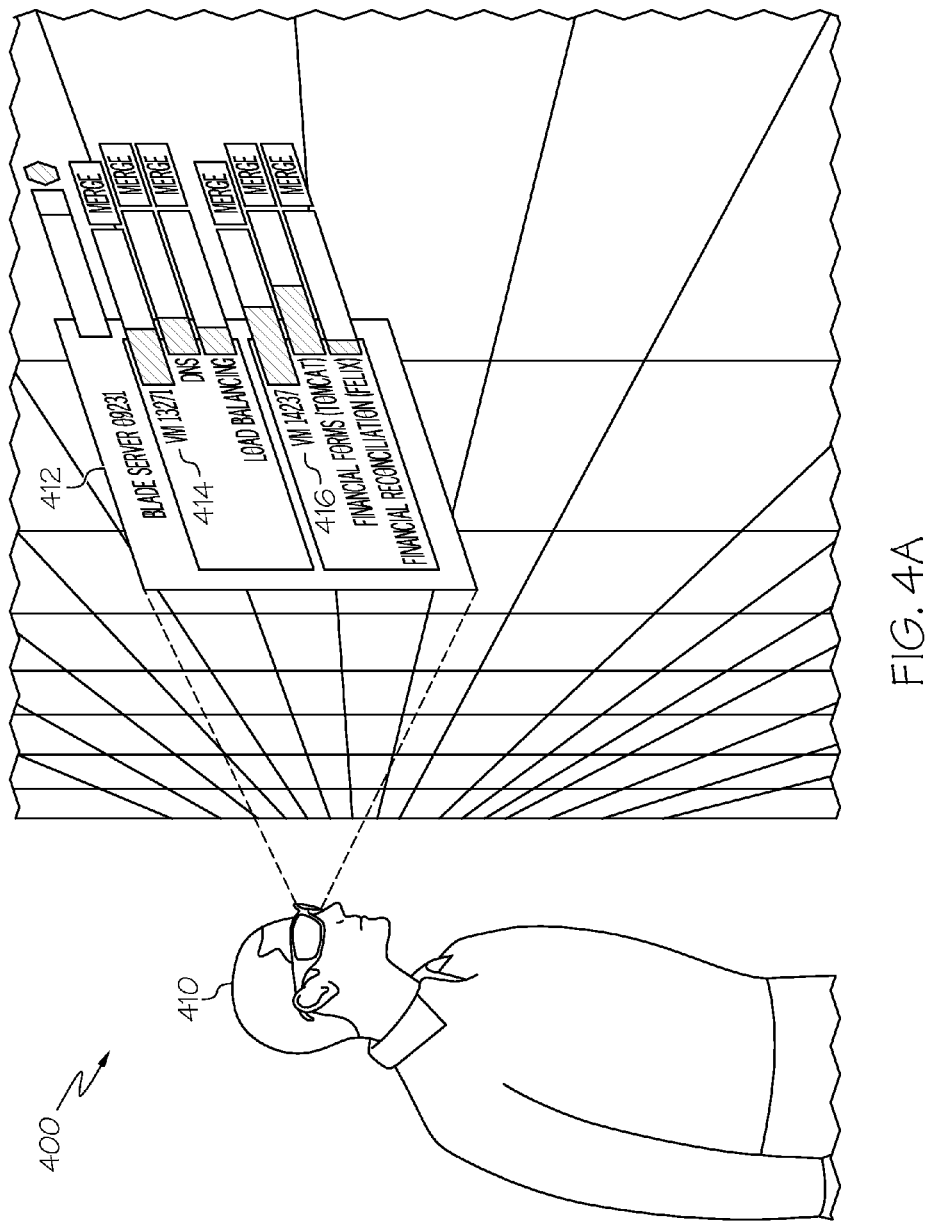

SYSTEM AND METHOD FOR INCREASING THE SYSTEM AWARENESS OF IT OPERATIONS PERSONNEL WITH AUGMENTED REALITY

BACKGROUND

The disclosure relates generally to the system awareness of IT operations personnel, and more specifically, to increasing the system awareness of IT operations personnel with augmented reality.

SUMMARY

According to one embodiment of the disclosure, a method includes receiving sensor data from a sensor. The sensor data includes location data and an image of a viewing area. The method also includes determining markers in the viewing area based on the sensor data. The markers indicate Configuration Items ("CI's") within the viewing area. The method further includes determining a coordinate system of the viewing area utilizing the sensor data. The method still further includes receiving CI data corresponding to the CI's within the viewing area. The method even further includes formatting for display the CI data. The formatting includes generating a visual representation based on the CI data. The formatting also includes projecting the visual representation onto the coordinate system in an augmentation pane based on coordinates of the markers. The formatting further includes overlaying the viewing area with the augmentation pane.

Other objects, features, and advantages of the present disclosure are apparent to persons of ordinary skill in the art in view of the following detailed description of the disclosure and the accompanying drawings.

BRIEF DESCRIPTION OF THE DRAWINGS

For a more complete understanding of the configurations of the present disclosure, needs satisfied thereby, and the objects, features, and advantages thereof, reference now is made to the following description taken in connection with the accompanying drawings.

FIG. 4A illustrates a system for increasing the system awareness of IT operations personnel with augmented reality in use by an IT operations agent servicing a server rack.

DETAILED DESCRIPTION

Figure 1:
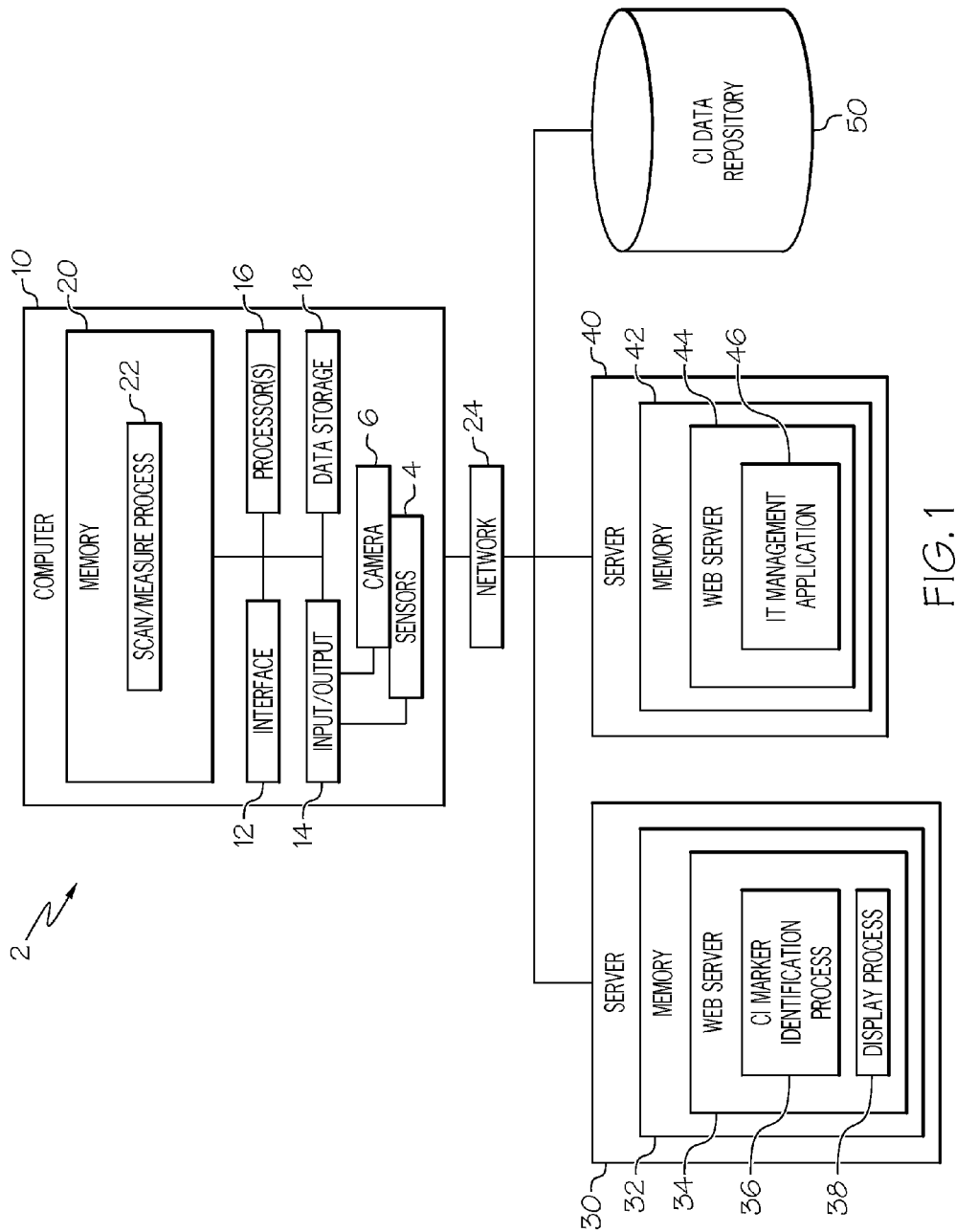
FIG. 1 illustrates a block diagram of a system for increasing the system awareness of IT operations personnel with augmented reality in accordance with a particular embodiment.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language, such as JAVA®, SCALA®, SMALLTALK®, EIFFEL®, JADED, EMERALD®, C++, C#, VB.NET, PYTHON® or the like, conventional procedural programming languages, such as the "C" programming language, VISUAL BASIC®, FORTRAN® 2003, Perl, COBOL 2002, PHP, ABAP®, dynamic programming languages such as PYTHON®, RUBY® and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to aspects of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

Data center IT staff members are often required to administer manual repairs to large physical computing components. The Impact of powering off the wrong machine or modifying an incorrect disk, server, or server rack can be far-reaching, and could cause widespread disruptions in service. In the case of a service provider, infrastructure changes may affect many businesses and can have a detrimental impact on service level agreements ("SLA"). Such disruptions can cause high levels of direct financial or reputational cost to the service provider and their clients.

For example, operations team members in a large data center are assigned a change order to replace a server's failed disk drive. There are several opportunities to introduce errors during such a repair. The instructions to the servicer can be incomplete or incorrect. The physical map of the server room can also be incomplete or out of date. The machines can be labeled incorrectly. The servicer may service the wrong machine (e.g., misread the label, misread the data center map, or write down the wrong machine name). Finally, if the repairs are being made in connection with a poorly performing application, the machine may not run the specified application. In other words, the failing application may have been moved to a second server that now requires repair. A person of ordinary skill in the art will understand other scenarios in which errors can occur during data center administration activities.

Embodiments of the present disclosure harness features of augmented reality systems in the context of infrastructure and performance management, in order to prevent damage to data center operations during maintenance procedures. Certain embodiments fuse augmented reality systems with data streams available from IT management and monitoring products to present relevant information to IT staff and provide them with the capabilities of using software applications to administer systems while, just before, and/or after physically administering those systems as appropriate.

FIG. 1 illustrates a system 2 for increasing the system awareness of IT operations personnel with augmented reality. In accordance with the illustrated embodiment, a computer 10 retrieves position data from sensors 4 through input/output 14. A scan/measure process 22 collects data indicating a camera 6 position and viewing area. Camera 6 captures an image of the viewing area. The position data and image is passed to a Configuration Item ("CI")/marker identification process 36. CI/marker identification process 36 processes the position data and viewing area image and determines whether any predefined markers are visible in the viewing area. CI/marker identification process 36 determines a coordinate system of the viewing area based on the position data and the predefined marker positions. CI/marker identification process 36 queries an IT management application 46 for data associated with any CI's in the viewing area. IT management application 46 queries CI data repository 50 for CI data concerning the viewing area CI's. The CI data includes, for example, performance information, configuration information, and task orders. CI/marker identification process 36 formats an augmentation pane for display by generating a visual representation based on the CI data and projecting the visual representation onto the coordinate system. The viewing area is overlaid with the augmentation pane such that the visual representation appears in the viewing area.

Augmented reality systems overlay pertinent information on a virtual pane over which the natural world is viewed and experienced. The overlay is accomplished via a device (e.g., smart-phone, computer, tablet, head-mounted display, eye glasses, contact lenses, virtual retinal display, or other hand-held device). For example, the device can include a heads-up display, display enabled glasses, or retinal projection. The augmented reality pane provides a surface upon which immediately relevant information may be presented to guide one's actions in order to increase their correctness, efficiency, and/or effectiveness. Immediately relevant information is referenced based on, for example, a user's location, gestures, and other latent objects in the environment.

Infrastructure management systems identify and track the assets of an organization, and assist the organization in keeping those assets in operational order. Such systems assist in, for example, specifying, controlling, and increasing the predictability of continuously successful outcomes. Among the reasons that errors occur is that information, such as power diagrams, or even the physical location of equipment, is out of date or incomplete. As virtualization gains prominence and the complexity of our systems and their deployments increase management tasks, impacts to complete systems during isolated physical infrastructure modifications become more important and difficult to manage.

Performance management systems manage applications, services, and networks to provide real-time system awareness, and identify the impacts of changes. Such systems enable operations personnel to identify and address issues proactively to provide more reliable support for value producing operations.

In certain embodiments, CI data includes lists of processes, system metrics and commands associated with each corresponding CI. For example, a list of processes includes operating systems, drivers, software programs, threads, virtual machines, and services running on a CI. In another example, a list of system metrics includes disk usage metrics, memory usage metrics, memory capacity metrics, and system downtime metrics. In still another example, a list of commands includes a startup command, a shutdown command, a restart command, a migrate command, a move command, a change configuration value command, and a change priority command. Those of ordinary skill in the art should understand the teachings of the present disclosure to include a variety of other processes, system metrics and commands associated with each corresponding CI in accordance with other embodiments.

In certain embodiments, sensors 4 include an accelerometer, a position tracking device, and a camera. For example, a position tracking device includes a global positioning system ("GPS") device. In another example, a position tracking device includes a Wi-Fi triangulation device. Still other position tracking devices are enabled in accordance with other embodiments of the present disclosure. In other embodiments, sensors 4 include a WiFi radio, a radio frequency identification ("RFID") scanner, an RFID tracking and triangulation system, and a compass.

Certain embodiments of system 2 provide multiple modes of interfacing with a system, providing several distinct tools for input and output of data. Examples of inputs include keyboard, mouse, speech input, pen, touch, manual gestures, and body movements. As applied to the present disclosure, a personal computer with a traditional mouse/keyboard configuration is not an optimal data retrieval or dissemination device in the context of a crowded server room. Other input and output modalities are better suited for such environments.

Although the embodiments used in connection with the present disclosure primarily describe data center operations, those of ordinary skill in the art should interpret the teachings of the present disclosure to enable use of the disclosed embodiments in, for example, a user's office space or in a communications cabinet, hall, or crawl space where routers, switches, and/or communication cables are present. Further embodiments are appropriate for many other IT management operations settings.

The hardware components in computer 10 include a processor 16, display (e.g., as part of input/output 14), and sensors 4. In certain embodiments, sensors 4 include an accelerometer, global positioning system ("GPS"), and compass. The display includes various technologies including: head-mounted, eye glasses, contact lenses, virtual retinal displays, and digitally projected displays. For example, system 2 includes computer 10 that is completely embedded in the frames of a pair of eyeglasses. One lens of the eyeglasses has a small, clear plastic display embedded in the top right corner of the right eye lens.

In certain embodiments, sensors 4 are embedded within glasses. In other embodiments, sensors 4 are embedded within a retinal display assembly. In still other embodiments, sensors 4 are embedded in a phone, a tablet, a laptop, or some other computing device.

Other components of computer 10 include memory 20, interface 12, processor(s) 16, and data storage 18. Scan/measure process 22 is loaded into memory 20 from data storage 18, and monitors input sensors 4 and camera 6. Scan/measure process 22 passes sensor and camera data to other processes, either locally or over network 24, for further processing in accordance with the teachings of the present disclosure. Such modularity in components is important due to power and processing constraints on lightweight systems. For example, if computer 10 is embedded in a pair of eyeglasses, form-factor requirements in such a design may render processing capacity on computer 10 low. In such circumstances, servers are used to provide processing power over network 24.

Sensors 4 include any modern tracking technologies, including digital cameras, optical sensors, accelerometers, GPS devices, gyroscopes, solid state compasses, radio-frequency identification ("RFID") sensors, and wireless sensors. For example, a portable device (i.e., computer 10) in system 2 employs a combination of camera 6, a GPS device, an accelerometer and an RFID sensor in order to collect position data about the surroundings of computer 10. Such devices may be embedded within the device, or connected to the device by wire or wireless connection. Scan/measure process 22 polls each sensor and passes the retrieved data to CI/marker identification process 36. In other embodiments, Scan/measure process 22 stores the retrieved position data in a database.

Sensors 4 collect data and compare such position data against predetermined data points of the same viewing area. For example, a scan is conducted in which a 3D model of a server room is generated. Markers are selected based on server locations within the viewing area on the computer model, and the live collected data is compared against the predetermined locations based on the position data. In this example, the camera location, direction, and viewing area image are passed to an identification process. The identification process uses the positioning data to determine a set of markers that may be visible in the viewing area. The identification process combs the image pixels to detect features that resemble the predetermined markers, and maps a coordinate system to the viewing area. Graphics are then generated that contain information about the markers, or features that reside at fixed positions in the coordinate system (e.g. a server rack with respect to a server row). The graphics are then projected onto the coordinate system, and leader lines are generated to label the features with the generated graphics.

Sensors 4 may collect data and improve a pre-existing map in a known environment using simultaneous localization and mapping techniques. For example, the information gathered by sensors 4 is integrated into an existing model. RFID tags, barcodes, or labels are read by camera 6, and marker positions are updated relative to the predetermined markers, based on the position data and the position of detected features.

Camera 6 is connected to computer 10, and may be fixed or removable from computer 10. For example, computer 10 in system 2 is embedded in eyeglasses. Camera 6 is located alongside the top right hinge of the frames. In certain embodiments, camera 6 data streams are augmented by alternative visual data streams. For example, a security camera feed or a web camera on a workstation modifies the data streams from camera 6. In the present embodiment, camera 6 is attached to computer 10. In other embodiments, camera 6 includes a variety of cameras connected via network 24 to compose a more complete picture of the viewing area.

In the illustrated embodiment in FIG. 1, server 30 contains memory 32, web server 34, CI/marker identification process 36 and display process 38. Server 40 includes memory 42, web server 44 and IT management application 46. CI data repository 50 is separated from server 30 and 40 in the illustrated embodiment. However, the present disclosure should not be limited to this configuration. Instead, any combination of servers, computers, repositories, and processes may be distributed across any number of servers. For example, in some embodiments, computer 10 runs CI/marker identification process 36 and display process 38. Such an embodiment presents an advantage over the current configuration because operations are processed locally without incurring transmission or network delays.

However, scaling such an embodiment is more expensive because processing units must reside at each computer 10. In certain embodiments, many portable devices with lightweight sensors and minimum processing capacity are distributed to IT staff. In order to reduce cost, the devices (i.e., computer 10 in system 2) contain minimum memory and processing capacity. Instead, the devices act as portable sensors and send position data back to server 30 for storage and processing. Thus, in certain embodiments, much of the processing is completed on a server, and distributed to lightweight clients.

In certain embodiments, computer 10 connects directly to CI data repository 50 in order to store position data, and other data relevant to CI's stored in the repository. In other embodiments, the CI data stored through an intermediary server process (i.e., CI/marker identification process 36, or IT management application 46.

CI data repository 50 includes any database, data store, file system, file transfer protocol ("FTP") site, or any other data mining or retrieval system. CI data repository 50 is connected to network 24, and is accessible from any remote computer, server, process, or user with credentials to access the stored data.

Image processing includes any form of signal processing for which the input is an image treated as a 2D digital signal. The image processing is configured to determine feature edges by processing pixels of received images. Such methods include corner detection, blob detection, edge detection, thresholding, or any other feature detection methods.

Other systems may utilize CI data repository 50. For example, IT management application 46 may support a free standing web application that monitors the status of CI's or other IT related tasks. Managers and IT staff can also check the status of servers and change requests using IT management application 46. In this embodiment, CI/marker identification process 36 also uses IT management application in order to retrieve CI specific data from identified CI's in the viewing area. IT management application 46 retrieves data for both types of users (i.e., network users from CI/marker identification process 36 and web users from the web interface) from CI data repository 50.

CI's include any fundamental unit of a configuration management system. For example, CI's include requirements documents, software, models and plans. CI's help to avoid the introduction of errors into a system and CI tracking ensures compatibility with other elements in the system. In certain embodiments, IT management application 46 is part of a configuration management system. IT management application 46 identifies and tracks assets of an organization, and assists the organization in keeping those assets in working order by specifying, controlling, and increasing the predictability of continuously successful outcomes. IT management application 46 accomplishes this by providing users with power diagrams or alerting them to out of date or broken resources through a web interface. The interface provides users with access to status information on change requests, server utilization rates, and other technical details associated with data center health and performance metrics.

Predefined markers include any object or interest point placed in the field of view of an imaging system that appears in the scene of the image produced. Markers are used as a point of reference or a measure in augmented reality systems. For example, fixed points or lines within a scene are matched to predetermined lines or marks such that the relative location and size of other objects in the scene can be identified. The size and position of a predetermined mark in the scene gives clues as to the size and positioning of other unidentified objects within the scene.

A coordinate system is a system which uses one or more coordinates to uniquely determine the position of a point, line or other geometric element in a space. The coordinate system in system 2 is used to map graphics generated in later steps of the systems and methods of the present disclosure to the predefined markers or CI's matched in the viewing area.

The viewing area includes any area visible to camera 6, such that the objects in the viewing area are all present in any image captured by camera 6. In certain embodiments, image processing algorithms are applied to the images captured by camera 6, and CI/marker identification process 36 matches features identified in the image processing step to predetermined markers or CI's from CI data repository 50 and other repositories.

Computer 10 includes an input/output 14. In one embodiment, input/output 14 includes, among other things, a display. For example, the display may include a cell phone screen. Images from camera 6 are displayed on the screen, and an augmentation pane is overlaid on top of the captured images in order to present and augmented view of the viewing area. In other embodiments, the augmentation pane is projected upon a transparent lens between the user and the real objects in his or her view such that the projections correspond to their associated real objects. In similar embodiments, a retinal projection can project such augmentation directly onto the user's eye. One of ordinary skill in the art will understand the teachings of the present disclosure to apply to many other types of displays in accordance with the wide array of devices enabled by input/output 14.

visual representations include text, bar charts, pie charts, trend charts, line graphs, and any other system of visual data representation optimized for viewing in an augmented reality system. The graphics are representative of the CI data retrieved from IT management application 46. For example, charts of retrieved CI data may be generated in contrasting colors from the viewing area so that the graphics in the augmentation pane are visible against the backdrop of the viewing area. The graphics may be indicative of the relative status of the corresponding item in the viewing area. For example, an overworked server with a CPU utilization rate above 70% is displayed as a red bar chart, signifying that this server requires service or attention from IT staff.

The visual representation is projected onto the coordinate system in the augmentation pane. For example, a leader line calls out a particular server and displays performance information related to the processing and memory usage of the server in a bar chart and a gauge.

Consider an example where a laptop or console is used to read a change request identifying a problematic machine. A servicer may face difficulties in locating the machine in question. In this example, the servicer may write down the serial number and row location of the server. However, hundreds or thousands of servers may be present in the specified server room. Crowded server rooms are difficult to navigate, and often present operators with difficulty in locating specified resources. Furthermore, a determination of which virtual machines are running on a particular server is difficult because the virtual machines provisioned on each physical server may change frequently. Server rack labeling mistakes are also responsible for some servicer-related errors.

Other mistakes can occur during servicing. For example, if operations management staff migrate an application to the wrong server, a servicer may unknowingly service the wrong server. The dynamic nature of virtual systems lends itself to such potentially disastrous mistakes. For example, a migration that was scheduled to occur has been delayed, causing the servicer to add memory to the wrong physical server. In other examples, a server is taken off line for alterations to hardware in accordance with a particular application's needs. But, unbeknownst to the servicer, the server also hosts the domain name server, or load balancer. Pulling this server offline grinds all requests to applications and services in the data center to a halt.

Thus, configuration management systems are important components in IT infrastructure support groups, and can help mitigate and reduce the occurrence of service-disrupting events due to server repair, software updates, or other essential capacities of IT management.

In another embodiment of system 2, scan/measure process 22 continuously monitors inputs such as field of vision, positioning, and other data streams related to a user. The data input into system 2 is received from a camera, GPS device, WiFi triangulation sensor, a scanner, and other devices and services configured to receive input from the user's surroundings. Some devices are integrated into a device worn by the user as part of a data collection and display device. In certain embodiments, such a device is affixed to the user's body.

For example, system 2 includes a sensor device that resembles a pair of ordinary glasses. The device includes a display pane embedded in one or more lenses of the glasses. The device also includes a GPS device, and a cellular and WiFi network card for data transmission embedded in the frame of the glasses. In certain embodiments, the device has a computer embedded in the frame of the glasses including memory and a processor. The computer performs scanning and image recognition processes, and drives the embedded display with pertinent information retrieved from resource management applications available via a network.

Depending on the data retrieved from the device, system 2 uniquely identifies specific CI's or, more reliably, markers indicating known CI's. System 2 further displays the name, location, and other relevant information about the CI's to the user. Data streams such as the positioning of the user may also be used to identify nearby CI's in order to more proactively load relevant data. Other CI data streams can also be used. Once the relevant CI's are uniquely identified, the invention queries a set of applications which contain information (configuration, activity, performance, etc.) about the CI's. Upon receiving the CI-related data, the invention uses the data about the positioning of CI's in the user's field of vision to arrange and display select received data about the positioning of CI's in the user's field of vision to arrange and display select received data about the visible CI's upon the augmentation pane, overlaying the information in a correlated position to the identified location of the physical CI within the user's field of vision. As the continuous CI identification monitoring process continually updates relevant CI's, system 2 continuously updates the data related to them as well as the field-of-vision relevant position and displays associated with visible CI's.

Figure 2:
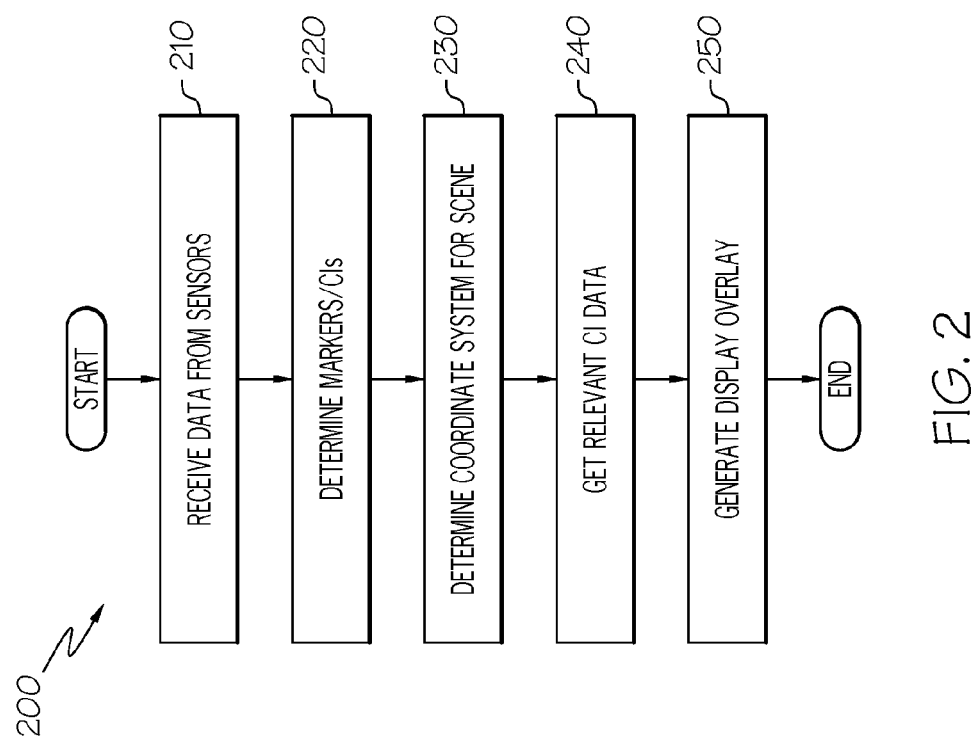
FIG. 2 illustrates a flowchart of a method for increasing the system awareness of IT operations personnel with augmented reality in accordance with another embodiment.

Referring to FIG. 2, a method 200 for increasing the system awareness of IT operations personnel with augmented reality is illustrated. At step 210 in the illustrated embodiment, data is received from sensors. In this step, input/output 14 receives input from camera 6 and sensors 4. The receiving step takes place at either computer 10, or one of the servers (i.e., server 30, 40) enumerated in system 2 of FIG. 1. In one example, step 210 takes place at server 30 so that minimal processing capacity is required on computer 10. In this embodiment, a centralized processing unit handles all the steps in method 200.

In other embodiments, computer 10 receives data from sensors and performs other steps of method 200. In such embodiments, computer 10 may perform image processing and marker matching in accordance with further steps of method 200, and may contact server 40 for information on markers and CI's in the viewing area.

At step 220, markers and CI's are determined. In certain embodiments, images retrieved from camera 6 in accordance with step 210 are processed to determine features, markers, CI's, predetermined markers, or predetermined CI's. These objects may be matched with objects from IT management application 46 and CI's from CI data repository 50. The objects may be matched with predetermined object profiles stored with the CI/marker identification process. The objects are matched using position data, and other relevant data received from the sensors. For example, WiFi triangulation is used to pinpoint the location of computer 10 between 2 access points. Using this information, CI/marker identification process narrows the field of possible CI's and markers to those CI's and markers physically located in the estimated viewing area of the user of computer 10. In another example, and RFID tag emits a low power signal that one sensor 4 from computer 10 detects. Using these multiple streams of CI/marker data, step 220 determines which markers and CI's are relevant to the user of computer 10.

At step 230, a coordinate system for the scene is determined based on the positioning of the identified CI's and marks from step 220 and other position data received in step 210. A coordinate system is extrapolated from the images received so that graphics can be generated and applied to the augmentation panel in later steps. In this example, a scene-aware call-out or leader line is used to attach graphics displaying relevant information to known CI's or markers.

The coordinate system generated at step 230 also helps establish a frame of reference for new markers and CI's detected in the viewing area. For example, when viewing a scene of known CI's a new recognizable label is detected in the viewing area. The image processing processes detect that the label corresponds to a new server identification number, using IT management application 46. In this instance, a new marker is generated and the marker is placed in the scene according to the coordinate system, thus giving the new generated marker position information.

At step 240, relevant CI data is retrieved. In this step, new and predetermined CI's and markers are looked up according to an identifier, and corresponding data is retrieved from CI data repository 50. The data includes CI metadata, performance data, application data, task data, and any other data relevant to the CI. The identifier includes one or more of an object identifier, primary key identifier, position attributes (e.g., in a spatial database), and any other means of uniquely identifying objects in a repository.

At step 250, a display overlay is generated such that information relevant to the CI's and markers identified in the viewing area is presented to the user of computer 10. In this step, an augmentation panel is used to overlay CI graphics using the coordinate system generated in step 230. The display may be generated on a server, and sent to computer 10 for display. In other embodiments, the display may be generated on computer 10.

Figure 3:
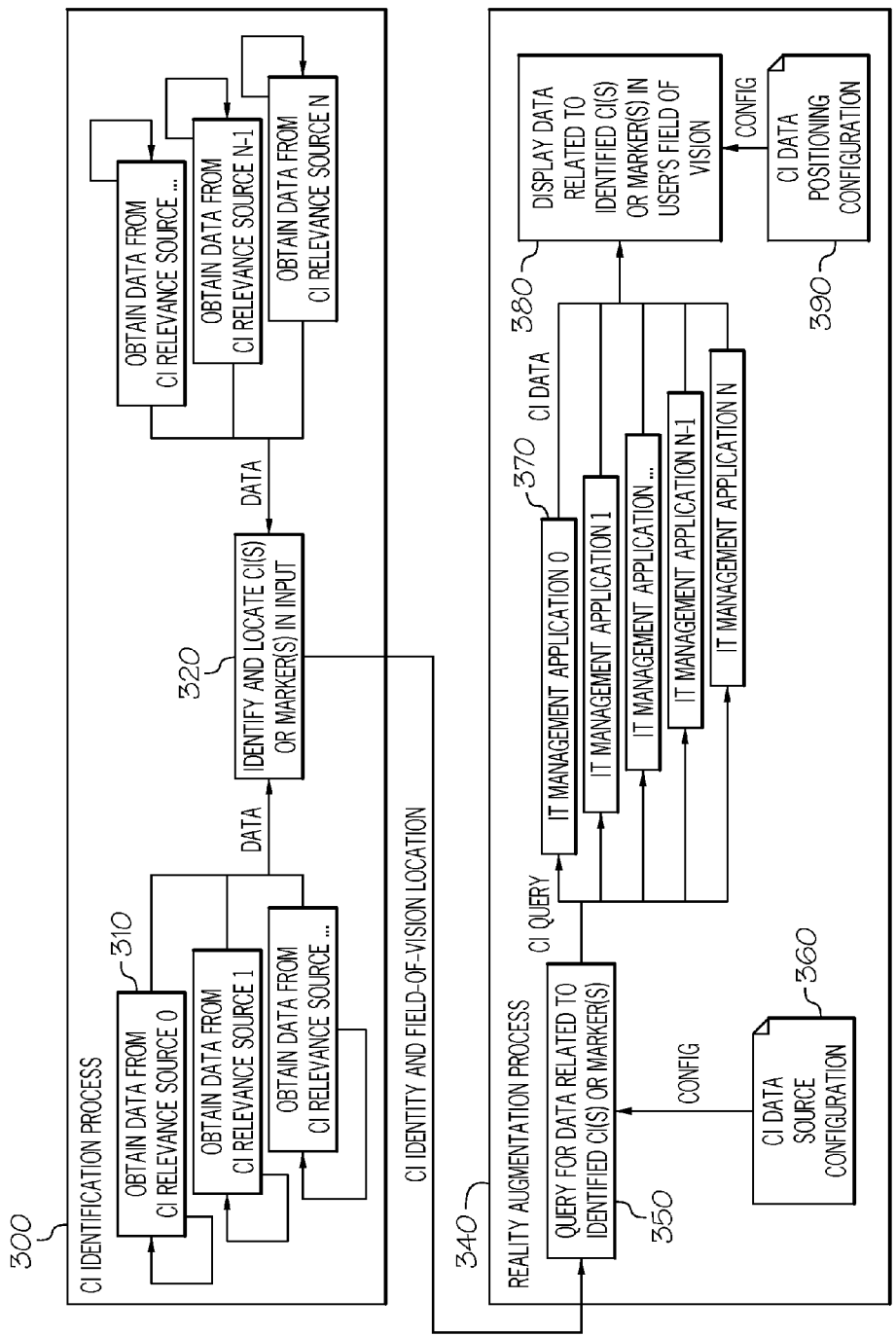
FIG. 3 illustrates a flowchart of a method for increasing the system awareness of IT operations personnel with augmented reality in accordance with still another embodiment.

Referring to FIG. 3, a flowchart of a method for increasing the system awareness of IT operations personnel with augmented reality in accordance with still another embodiment is illustrated. A CI identification process 300 obtains data from various CI relevance sources 310. Data from these sources is compiled in step 320 to identify and locate CI's or markers in the input data streams. CI data is then transmitted from step 320 to step 350.

At step 350, a reality augmentation process 340 queries for data related to identified CI's or markers. The queries are generated according to a CI data source configuration 360 that details the information required to make requests for information about CI's. For example, CI data source configuration 360 contains an IP address and database connection strings for CI data repository 50 from FIG. 1.

An IT management application processes the queries and returns the relevant data at step 370. The data is displayed and placed in the user's field of vision according to a CI data positioning configuration 390 using an augmentation panel in step 380.

Referring to FIG. 4A, a system 400 for increasing the system awareness of IT operations personnel with augmented reality in use by an IT operations agent servicing a server rack is illustrated. In certain embodiments, a mobile eyeglass device 410 detects position information and captures images that are relayed to a server. At the server, CI and marker information is matched to corresponding physical elements in the captured images. Detailed information corresponding to the matched CI and markers is retrieved and displayed in an augmentation pane as shown at display 412. For example, the blade server identified in display 412 is identified in the viewing area of eyeglass device 410. Several virtual machines 414 and 416 are running on that server, and information regarding the performance of those virtual machines and their processes are returned and displayed to the user on an augmentation pane. In the above example, retrieving virtual machine information is part of IT management application 46 of FIG. 1.

Figure 4B:
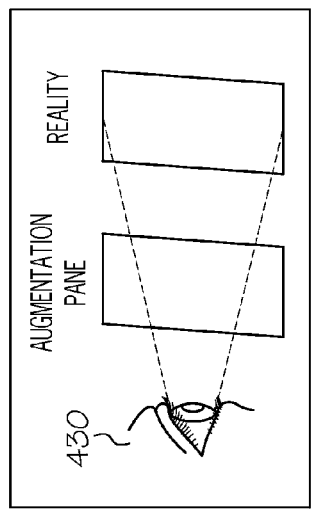
FIG. 4B illustrates an augmentation pane in a system for increasing the system awareness of IT operations personnel with augmented reality.

Referring to FIG. 4B, an augmentation pane in one embodiment of a system for increasing the system awareness of IT operations personnel with augmented reality is illustrated. The depicted embodiment explains the augmentation pane concept from the point of view of a user's eye 430. The augmentation pane is placed between the user's eye 430 and reality, and is transposed on some clear filter that allows the user to view reality. Other example embodiments replicate this by using a camera to relay the view of reality to a screen, then superimposing the augmentation pane over the relayed scene. Those of ordinary skill in the art should interpret the teachings of the present disclosure to enable a variety of systems (e.g., eyeglasses, cell phone, PDA) to implement the discussed embodiments.

Figure 4C:
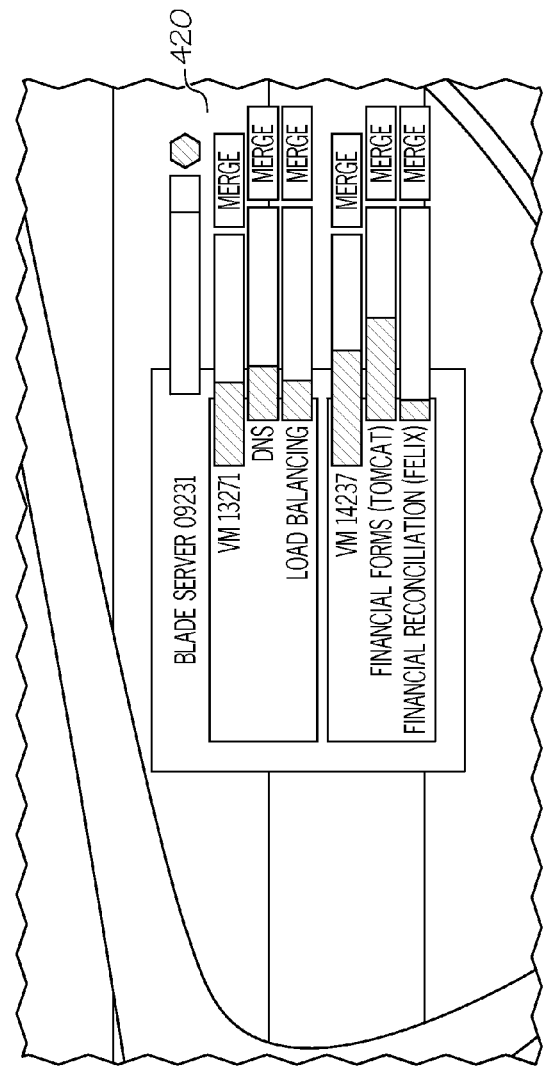
FIG. 4C illustrates an example augmented view of a server rack in a particular embodiment of a system for increasing the system awareness of IT operations personnel with augmented reality.

Referring to FIG. 4C, an example augmented view of a server rack is illustrated in accordance with one particular embodiment. In this example, the user experiences the view in view 420 by looking through eyeglasses. The eyeglasses in the illustrated embodiment are configured with a clear peripheral screen overlaying the right eye of the eyeglasses. In such an embodiment, the left eye may be left clear so that a user can more clearly see through and is not blinded by the overlain information. Many other embodiments of eyeglasses are possible. For example, the peripheral screen can be positioned overlaying the left eye, or both eyes of the eyeglasses. In still other embodiments, a larger portion of the eyeglass lenses are overlaid with the peripheral screen.

The flowchart and block diagrams in the figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. A method, comprising:
   receiving sensor data from a sensor, the sensor data comprising location data and an image of a viewing area;
   determining markers in the viewing area based on the sensor data, the markers indicating Configuration Items ("CI's") within the viewing area;
   determining a coordinate system of the viewing area utilizing the sensor data;
   determining at least one virtual machine running on a particular CI within the viewing area;
   receiving performance data for each virtual machine, the performance data comprising a list of processes running on each virtual machine on the particular CI; and
   formatting for display the performance data, the formatting comprising:
      generating a visual representation based on the performance data that identifies (1) each virtual machine and (2) performance information for each virtual machine;
      projecting the visual representation onto the coordinate system in an augmentation pane based on coordinates of the markers; and
      overlaying the viewing area with the augmentation pane to display the visual representation from the augmentation pane with a physical component, in the viewing area, that hosts the particular CI.

2. The method of claim 1, wherein determining the markers comprises processing the image of the viewing area by scanning the pixels of the image for features and mapping the markers to those features based on the location data.

3. The method of claim 1, wherein determining the markers comprises scanning the viewing area for labels, the labels corresponding to CI's within the viewing area.

4. The method of claim 1, wherein the performance data further comprises:
   a list of system metrics associated with each virtual machine; and
   a list of commands associated with each virtual machine.

5. The method of claim 1, wherein the sensor comprises:
   an accelerometer;
   a position tracking device; and
   a camera.

6. The method of claim 1, wherein receiving performance data for each virtual machine comprises:
   querying an Information Technology ("IT") management application for data related to the CI's within the viewing area.

7. The method of claim 1, wherein the sensor is embedded in glasses.

8. A computer configured to access a storage device, the computer comprising:
   a processor; and
   a computer-readable storage medium storing computer-readable instructions that when executed by the processor cause the computer to perform:
      receiving sensor data from a sensor, the sensor data comprising location data and an image of a viewing area;
      determining markers in the viewing area based on the sensor data, the markers indicating Configuration Items ("CI's") within the viewing area;
      determining a coordinate system of the viewing area utilizing the sensor data;
      determining at least one virtual machine running on a particular CI within the viewing area;
      receiving performance data for each virtual machine, the performance data comprising a list of processes running on each virtual machine on the particular CI; and
      formatting for display the performance data, the formatting comprising:
         generating a visual representation based on the performance data that identifies (1) each virtual machine and (2) performance information for each virtual machine;
         projecting the visual representation onto the coordinate system in an augmentation pane based on coordinates of the markers; and
         overlaying the viewing area with the augmentation pane to display the visual representation from the augmentation pane with a physical component, in the viewing area, that hosts the particular CI.

9. The computer of claim 8, wherein determining the markers comprises processing the image of the viewing area by scanning the pixels of the image for features and mapping the markers to those features based on the location data.

10. The computer of claim 8, wherein determining the markers comprises scanning the viewing area for labels, the labels corresponding to CI's within the viewing area.

11. The computer of claim 8, wherein the performance data further comprises:
   a list of system metrics associated with each virtual machine; and
   a list of commands associated with each virtual machine.

12. The computer of claim 8, wherein the sensor comprises:
   an accelerometer;
   a position tracking device; and
   a camera.

13. The computer of claim 8, wherein receiving performance data for each virtual machine comprises:
   querying an Information Technology ("IT") management application for data related to the CI's within the viewing area.

14. The computer of claim 8, wherein the sensor is embedded in glasses.

15. A computer program product comprising:
   a non-transitory computer-readable storage medium having computer-readable program code embodied therewith, the computer-readable program code comprising:
      computer-readable program code configured to receive sensor data from a sensor, the sensor data comprising location data and an image of a viewing area;
      computer-readable program code configured to determine markers in the viewing area based on the sensor data, the markers indicating Configuration Items ("CI's") within the viewing area;
      computer-readable program code configured to determine a coordinate system of the viewing area utilizing the sensor data;
      computer-readable program code configured to determine at least one virtual machine running on a particular CI within the viewing area;
      computer-readable program code configured to receive performance data for each virtual machine, the performance data comprising a list of processes running on each virtual machine on the particular CI; and
      computer-readable program code configured to format for display the performance data, the formatting comprising:
         generating a visual representation based on the performance data that identifies (1) each virtual machine and (2) performance information for each virtual machine;
         projecting the visual representation onto the coordinate system in an augmentation pane based on coordinates of the markers; and
         overlaying the viewing area with the augmentation pane to display the visual representation from the augmentation pane with a physical component, in the viewing area, that hosts the particular CI.

16. The computer program product of claim 15, wherein determining the markers comprises processing the image of the viewing area by scanning the pixels of the image for features and mapping the markers to those features based on the location data.

17. The computer program product of claim 15, wherein determining the markers comprises scanning the viewing area for labels, the labels corresponding to CI's within the viewing area.

18. The computer program product of claim 15, wherein the performance data further comprises:
   a list of system metrics associated with each virtual machine; and
   a list of commands associated with each virtual machine.

19. The computer program product of claim 15, wherein the sensor comprises:
   an accelerometer;
   a position tracking device; and
   a camera.

20. The computer program product of claim 15, wherein receiving performance data for each virtual machine comprises:
   querying an Information Technology ("IT") management application for data related to the CI's within the viewing area.

\* \* \* \* \*